United States Patent [19]

Gordon

[11] 4,217,679
[45] Aug. 19, 1980

[54] MEAT DEBONING PROCESS

[76] Inventor: Matthew Gordon, 333 E. Ontario, Chicago, Ill. 60611

[21] Appl. No.: 931,140

[22] Filed: Aug. 4, 1978

[51] Int. Cl.$^3$ .............................................. A22C 17/04
[52] U.S. Cl. ......................................... 17/46; 17/51; 17/1 G
[58] Field of Search ............................. 17/1 G, 46, 51

[56] References Cited

U.S. PATENT DOCUMENTS

| 3,089,775 | 5/1963 | Lindall | 17/1 G X |
| 3,671,999 | 6/1972 | Downs et al. | 17/1 G |

FOREIGN PATENT DOCUMENTS 487353  6/1938  United Kingdom ........................ 17/51

Primary Examiner—Willie G. Abercrombie
Attorney, Agent, or Firm—Dressler, Goldsmith, Shore, Sutker & Milnamow, Ltd.

[57] ABSTRACT

A method is provided for separating meat adhered to bone from the underlying bone by supporting bone pieces with adhered meat on a surface having openings therethrough, directing high velocity streams of water droplets and air against the bone pieces to separate the meat therefrom in the form of small meat pieces (while leaving collagenous tissue attached to the bone) and permitting the small meat pieces to fall through the openings while retaining the bone pieces on the surface.

7 Claims, 5 Drawing Figures

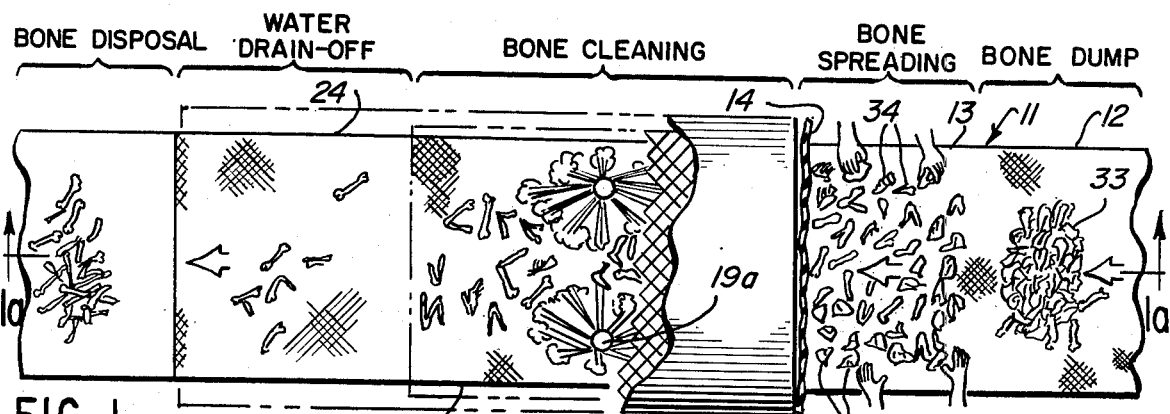
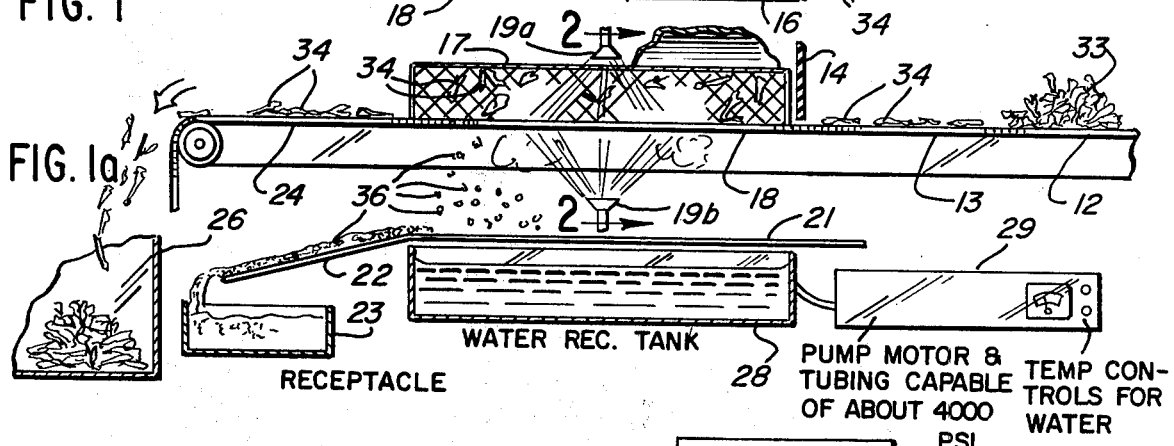
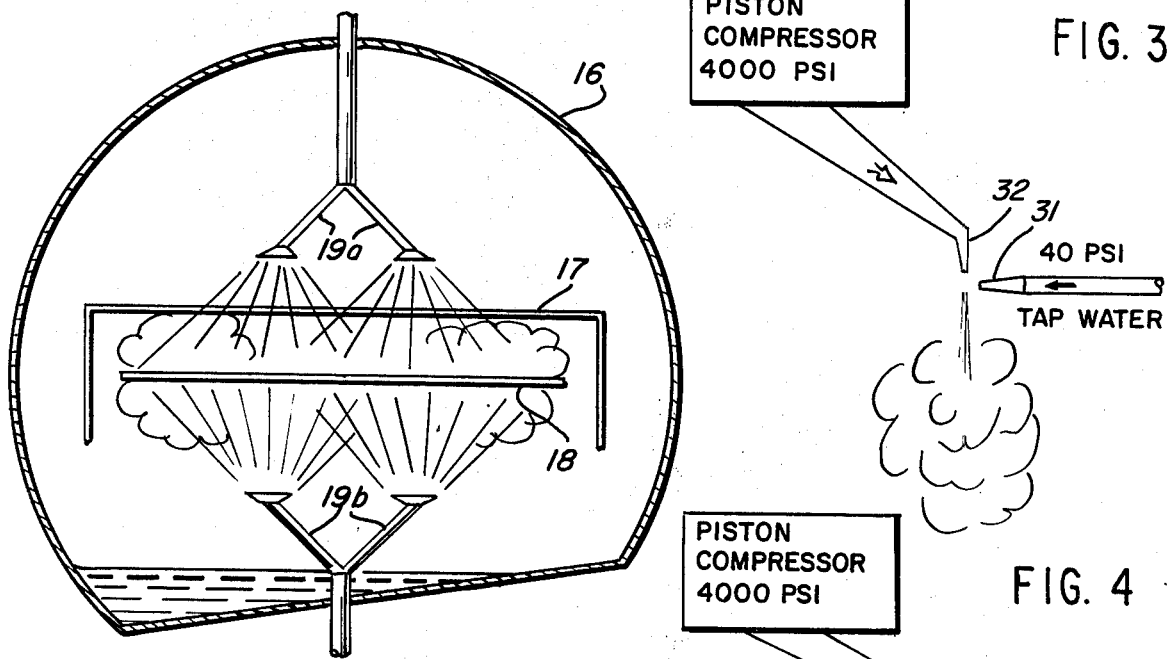
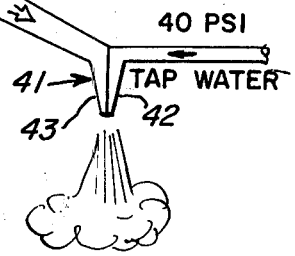

MEAT DEBONING PROCESS

BACKGROUND OF THE INVENTION

In the meat industry, it is desired to obtain as much edible meat as possible from each slaughtered animal. However, high labor costs make it uneconomical to cut away small pieces of meat adhering to bones, and particularly irregular bones such as vertebrae.

Nevertheless, such small pieces of meat are wholesome and may be used, if recovered, in communited meat products, such as hamburger meat, sausages, pieced and formed "steaks" and beef rolls.

It has been proposed to separate meat, and particularly chicken meat, from bones by the action of high velocity water jets. Downs U.S. Pat. No. 3,671,999, for example, discloses placing poultry pieces cooked on a mesh conveyor, directing high velocity water jets against the poultry pieces from both above and below the top flight of the conveyor and thereby separating meat pieces from the bones of the poultry pieces, and permitting the meat pieces to fall through the conveyor while the bones are conveyed to the end thereof.

Geisler U.S. Pat. Nos. 2,734,537 and 2,734,540 relate, respectively, to method and apparatus for separating meat from bones and disclose the use of high velocity jets which may be either water jets or air jets. When air jets are used there is a drying action on the meat and the bones.

The use of water jets, as disclosed in the prior art, adds water to the separated meat pieces, increasing their weight and thereby bringing such use into conflict with quality standards and with government regulations. The use of air jets is less effective than water jets in separating meat from bone and also, as indicated by the Geisler patents, dries the meat pieces.

Lindall U.S. Pat. No. 3,089,775 discloses a method for removing meat from bone by "shot blasting" with solid frozen particles of ice or carbon dioxide carried in a stream of high velocity air. Both ice and solid carbon dioxide are relatively expensive and their use adds to the cost of the process and makes it less attractive.

SUMMARY OF THE INVENTION

In accordance with the present invention, there is provided a method for recovering meat from bone which comprises bone pieces with meat adhered thereto onto a surface having openings therethrough, directing against said bone pieces high velocity jets of water droplets and air to separate said meat from said bone pieces in the form of small meat pieces, permitting said small meat pieces to fall through said openings while retaining said bone pieces on said surface.

The use of streams of water droplets and air balances the wetting action of the former against the drying action of the latter so that the final weight of the meat pieces is close to their natural weight. In addition, the combined action of water droplets and air provides an effective cutting action to separate the meat from the bone.

The amounts of air and water directed against the meat pieces as well as the velocity of the streams or the pressure which generates them is dependent on the average size of the meat and bone pieces processed, as well as the level of moisture in the meat and the character of the meat (e.g. toughness versus tenderness, fat versus lean, etc.). The deboning of beef from steer backbone segments requires more forceful jets than the deboning of poultry pieces.

Overall, a suitable range for the amount of water is from about 0.2 to about 1.5 pounds of water per 10 pounds of gross bone weight. For heavier pieces, a preferred range is from about 0.8 to about 1.5 pounds of water per 10 pounds of gross bone weight.

Suitable jet streams of air and water droplets may be provided through known nozzle mechanisms. Water and air may be supplied to a single nozzle to emerge therefrom as a single stream, or water and air may be supplied to separate nozzles placed close together at right angles to each other so that a water stream enters a high velocity air stream and is entrained thereby. Typically, water is supplied to a water nozzle or to a combined water-air nozzle at a pressure from about 20 to 100 pounds per square inch and air is supplied at a pressure from about 2,000 to about 8,000 pounds per square inch.

BRIEF DESCRIPTION OF THE DRAWINGS

The invention is best understood by reference to the drawings in which:

FIG. 1 is a fragmentary plan view of apparatus suitable for the practice of the process of this invention;

FIG. 1a is a fragmentary cross-section of the apparatus of FIG. 1 along plane 1a—1a;

FIG. 2 is a cross-section of a portion of the apparatus of FIG. 1a along plane 2—2;

FIG. 3 is a diagramatic representation of a jet system utilizing separate nozzles for air and water; and FIG. 4 is a diagramatic representation of a jet system utilizing separate nozzles for air and water.

DETAILED DESCRIPTION OF THE INVENTION

As may be seen in FIGS. 1 and 1a, the apparatus comprises open mesh belt 11, the top flight of which moves to the left as shown in drawings. A portion of the belt, shown on the right is bone dump section 12, to the left of which is bone spreading section 13. Curtain 14, made of a heavy flexible material such as sheet rubber, is suspended above the belt at a distance to provide sufficient head room for the bones at the desired height and to hold back any bones at a higher height.

Cylinder 16, shown in FIG. 2, extends around the belt and contains the jet spray, preventing it from wetting the entire operations area. Jump box 17 extends above and to the sides of bone cleaning section 18 of belt 11 and prevents the bones from falling off the belt.

Nozzles 19a, above the belt, and 19b, below the belt, provide high velocity streams of air and water droplets which cut into the bone and meat pieces and cut the meat away therefrom. Meat pieces, smaller than the bone pieces fall through the openings of the mesh belt onto table 21 from which they can be swept down chute 22 to receptacle 23. The bones, stripped of adherent meat, remain on the belt, passing into water drainoff section 24 and then dropping off into bone receptacle 26.

A second conveyor in belt form may be substituted, if desired, for table 21 and chute 22 for removing meat pieces from the process.

As may be seen in FIG. 3, each combined stream of air and water droplets may be generated from a tap water nozzle 31, typically supplied from a water source at 40 pounds per square inch, and air nozzle 32, typically supplied from a compressed air source at 4,000 pounds per square inch. When the effluent streams collide at a location near the nozzle tips the water stream is broken into droplets carried into the air stream.

Alternatively, as shown in FIG. 4, each nozzle 41 includes a water conduit 42, typically supplied from a water source at 40 pounds per square inch, and an air conduit 43, typically supplied from a compressed air source at 4,000 pounds per square inch. The water stream in conduit 42 is broken into droplets as it emerges by the parallel high velocity air stream.

For any particular operation with a particular type of meat product, some adjustment may be necessary to obtain a meat product in receptacle 23 which would have about the same water content as its natural water content on the bone. Typically, the natural water content of the meat is determined from a sample of the meat trimmed away by knife; and the water content of the product in receptacle 23 is compared with the water content of the sample. If the jet-trimmed product is lower in water content than the sample, the amount of water introduced through nozzle 31 of FIG. 3, or through conduit 42 of FIG. 4, is increased. Conversely, if the jet-trimmed product is higher in water content than the sample, the amount of water introduced is reduced.

In some instances, it may be desired to utilize a greater amount of water for the jet-trimming process than would be required for a meat product of natural water content. In such a case, the water content of the product in receptacle 23 would be too high, and it may be desirable to extract water from the meat pieces in a centrifuge (not shown) to bring the water content down to its natural level, or to any desired level.

The lower portion of cylinder 16 is closed off by inclined surface 27 for drainage of water from excess spray.

In a preferred aspect of the invention, the water is cold, at a temperature between about 0° C. to 20° C. to enhance the effectiveness of the jet in cutting the meat from the bone. Water receiving tank 28 is provided for cold water storage and equipment for pressurizing the water and cooling it (if necessary) is shown schematically at 29.

In operation, bone pieces having adhered meat are dumped onto belt 11 at bone dump section 12, as heap 33. The bone pieces are then spread by hand in bone spreading section 13 as the belt moves toward the left, the separated bone pieces being designated as 34. After passing under curtain 14 and into cylinder 16, the bone pieces are subjected to the high velocity jet action of nozzles 19a and 19b, causing bones 34 to undergo random, helter-skelter movement, contained by screen 17. Meat pieces 36 fall through the mesh screen and onto table 21 and are then pushed down chute 22 to receptacle 23. Bone pieces 34, after being stripped of adherent meat, pass off the end of belt 11 and drop into receptacle 23.

The method of this invention is most advantageously utilized with bone pieces which are difficult to trim by hand such as backbone pieces, joint segments, and rib cage segments of beef, lamb, pork and poultry animals.

The invention has been described with respect to its preferred embodiments, but it will be understood by those skilled in the art that modifications and substitutions may be made without departing from the essence of this invention.

What is claimed is:

1. A method for recovering meat from bone which comprises placing bone pieces with meat adhered thereto onto a surface having openings therethrough, directing against said bone pieces high velocity jets of water droplets and air to separate said meat from said bone pieces in the form of small meat pieces, all of said water droplets being in the liquid phase, permitting said small meat pieces to fall through said openings while retaining said bone pieces on said surface, said water being directed toward said surface at a pressure from about 20 to 100 pounds per square inch and said air being supplied at a pressure from about 2000 to about 8000 pounds per square inch, whereby meat is removed from said bone pieces without excessive water addition to the meat pieces and without excessive drying of the meat.

2. The method of claim 1 wherein said bone pieces comprise beef backbone segments.

3. The method of claim 1 wherein said water droplets comprise from about 0.2 to about 1.5 pounds of water per 10 pounds of gross bone weight.

4. The method of claim 1 wherein said water is cold water at a temperature between about 0° C. and about 20° C.

5. The method of claim 1 wherein said high velocity jets are produced at nozzles above and below said surface.

6. The method of claim 1 in which said surface is the surface of a mesh conveyor moving along a substantially horizontal flight to a far end thereof, said small meat pieces fall through said openings before reaching said far end and said bone pieces remain on said surface until they drop off said far end.

7. The method of claim 1 in which said surface is the surface of a mesh conveyor moving along a substantially horizontal flight to a far end thereof, said small meat pieces fall through said openings before reaching said far end and said bone pieces remain on said surface until they drop off said far end.

* * * * *

UNITED STATES PATENT AND TRADEMARK OFFICE
CERTIFICATE OF CORRECTION

PATENT NO. : 4,217,679
DATED : August 19, 1980
INVENTOR(S) : Matthew Gordon

It is certified that error appears in the above-identified patent and that said Letters Patent are hereby corrected as shown below:

Column 1, line 48 - --placing-- should be inserted between "comprises" and "bone".

Column 2, line 33- "separate nozzles" should be --single nozzle--.

Signed and Sealed this

Eleventh Day of November 1980

[SEAL]

Attest:

SIDNEY A. DIAMOND

Attesting Officer

Commissioner of Patents and Trademarks